United States Patent
Chard et al.

(10) Patent No.: US 10,770,971 B2
(45) Date of Patent: Sep. 8, 2020

(54) SINGLE-INPUT MULTIPLE-OUTPUT (SIMO) CONVERTER HAVING A CONTROLLER WITH SWITCHABLE REST STATES

(71) Applicant: TEXAS INSTRUMENTS INCORPORATED, Dallas, TX (US)

(72) Inventors: Gary Franklin Chard, Murphy, TX (US); Ariel Dario Moctezuma, Richardson, TX (US); Hasibur Rahman, Wylie, TX (US); Alex Kwasi Nyavor Titriku, Coppell, TX (US); Srinath Hosur, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/428,525

(22) Filed: May 31, 2019

(65) Prior Publication Data

US 2020/0099294 A1    Mar. 26, 2020

Related U.S. Application Data

(60) Provisional application No. 62/736,577, filed on Sep. 26, 2018.

(51) Int. Cl.
*H02M 3/158* (2006.01)
*H02M 3/157* (2006.01)
*H02M 1/00* (2006.01)

(52) U.S. Cl.
CPC .......... *H02M 3/158* (2013.01); *H02M 3/157* (2013.01); *H02M 2001/0003* (2013.01); *H02M 2001/009* (2013.01)

(58) Field of Classification Search
CPC .................. H02M 3/158; H02M 3/157; H02M 2001/009; H02M 2001/0003; H02M 3/22
See application file for complete search history.

(56) References Cited

U.S. PATENT DOCUMENTS 8,581,629 B1   11/2013  Chard et al.
2017/0324323 A1*  11/2017  Liu .......................... H02M 1/08

\* cited by examiner

*Primary Examiner* — Adolf D Berhane
*Assistant Examiner* — Afework S Demisse
(74) *Attorney, Agent, or Firm* — Michael A. Davis, Jr.; Charles A. Brill; Frank D. Cimino

(57) ABSTRACT

A system includes an inductor and a first switch coupled between a first end of the inductor and a voltage supply node. The system also includes a second switch coupled between the first end of the inductor and a negative output supply node. The system also includes a third switch coupled between a second end of the inductor and a positive output supply node. The system also includes a fourth switch coupled between the second end of the inductor and a ground node. The system also includes a controller coupled to the first, second, third, and fourth switches. The controller is configured to provide an inductor charge mode, a positive boost mode, a negative boost mode, a first rest state involving the first switch, and a second rest state involving the fourth switch.

21 Claims, 5 Drawing Sheets

SINGLE-INPUT MULTIPLE-OUTPUT (SIMO) CONVERTER HAVING A CONTROLLER WITH SWITCHABLE REST STATES

CROSS-REFERENCE TO RELATED APPLICATIONS

This application claims priority to U.S. Provisional Application No. 62/736,577, filed Sep. 26, 2018, which is hereby incorporated by reference.

BACKGROUND

Power supplies and power converters are used in a variety of electronic systems. Electrical power is generally transmitted over long distances as an alternating current (AC) signal. The AC signal is divided and metered as desired for each business or home location, and is often converted to direct current (DC) for use with individual electronic devices or components. Modern electronic systems often employ devices or components designed to operate using different DC voltages. Accordingly, different DC-DC converters, or a DC-DC converter that supports a wide range of output voltages, are needed for such systems.

There are many different DC-DC converter topologies. The available topologies differ with regard to the components used, the amount of power handled, the input voltage(s), the output voltage(s), efficiency, reliability, size and/or other characteristics. One example DC-DC converter topology is a single-input multiple-output (SIMO) converter, which provides multiple outputs by charging and selectively discharging a single inductor to different nodes. In some SIMO converter scenarios, low efficiency and output oscillations may occur due to the components used as well as control issues.

SUMMARY

In accordance with at least one example of the disclosure, a system comprises an inductor and a first switch coupled between a first end of the inductor and a voltage supply node. The system also comprises a second switch coupled between the first end of the inductor and a negative output supply node. The system also comprises a third switch coupled between a second end of the inductor and a positive output supply node. The system also comprises a fourth switch coupled between the second end of the inductor and a ground node. The system also comprises a controller coupled to the first, second, third, and fourth switches. The controller is configured to provide an inductor charge mode, a positive boost mode, a negative boost mode, a first rest state involving the first switch, and a second rest state involving the fourth switch.

In accordance with at least one example of the disclosure, a single-input multiple-output (SIMO) converter circuit comprises a first switch coupled between a first inductor node and a voltage supply node. The SIMO converter circuit also comprises a second switch coupled between the first inductor node and a negative output supply node. The SIMO converter circuit also comprises a third switch coupled between a second inductor node and a positive output supply node. The SIMO converter circuit also comprises a fourth switch coupled between the second inductor node and a ground node. The SIMO converter circuit also comprises a controller coupled to the first, second, third, and fourth switches. The controller is configured to switch between a first rest state involving the first switch, and a second rest state involving the fourth switch.

In accordance with at least one example of the disclosure, a device comprises a first switch coupled between a first inductor node and a voltage supply node. The device also comprises a second switch coupled between the first inductor node and a negative output supply node. The device also comprises a third switch coupled between a second inductor node and a positive output supply node. The device also comprises a fourth switch coupled between the second inductor node and a ground node. The device also comprises an asynchronous state machine coupled to the first, second, third, and fourth switches. The asynchronous state machine is configured to switch between a first rest state involving the first switch, and a second rest state involving the fourth switch.

BRIEF DESCRIPTION OF THE DRAWINGS

For a detailed description of various examples, reference will now be made to the accompanying drawings in which.

DETAILED DESCRIPTION

Disclosed herein are single-input multiple-output (SIMO) converter topologies involving a controller with switchable rest states. In some examples, a SIMO converter is formed using an inductor, a first switch between a first end of the inductor and a power supply node, a second switch between the first end of the inductor and a negative output supply node, a third switch coupled between a second end of the inductor and a positive output supply node, and a fourth switch coupled between the second end of the inductor and a ground node. The SIMO converter also includes a controller coupled to the first, second, third, and fourth switches, where controller directs operations of the first, second, third, and fourth switches to transition from a rest state, to at least one boost iteration, and back to a rest state. In some examples, each boost iteration involves performing an inductor charge mode followed by a positive or negative boost mode. As needed, multiple boost iterations are performed before transitioning back to the rest state.

As described herein, the controller is configured to transition to or from different rest states. In some examples, a first rest state involves the first switch, and a second rest state involves the fourth switch. More specifically, for the first rest state, the controller is configured to close the first switch and to open second, third, and fourth switches. Meanwhile, for the second rest state, the controller is configured to close the fourth switch and to open the first, second, and third switches. By switching between the first and second rest states, the efficiency of the SIMO converter can be improved compared to only using a single rest state. Also, use of dual rest state operations can reduce undesired artifacts in a positive and/or negative supply output compared to only using a single rest state. In some examples, the controller is configured to switch between single rest state operations and dual rest state operations. To provide a better understanding, various SIMO converter topologies involving a controller with switchable rest states clamp control options and related systems and methods are described using the figures as follows.

Figure 1:
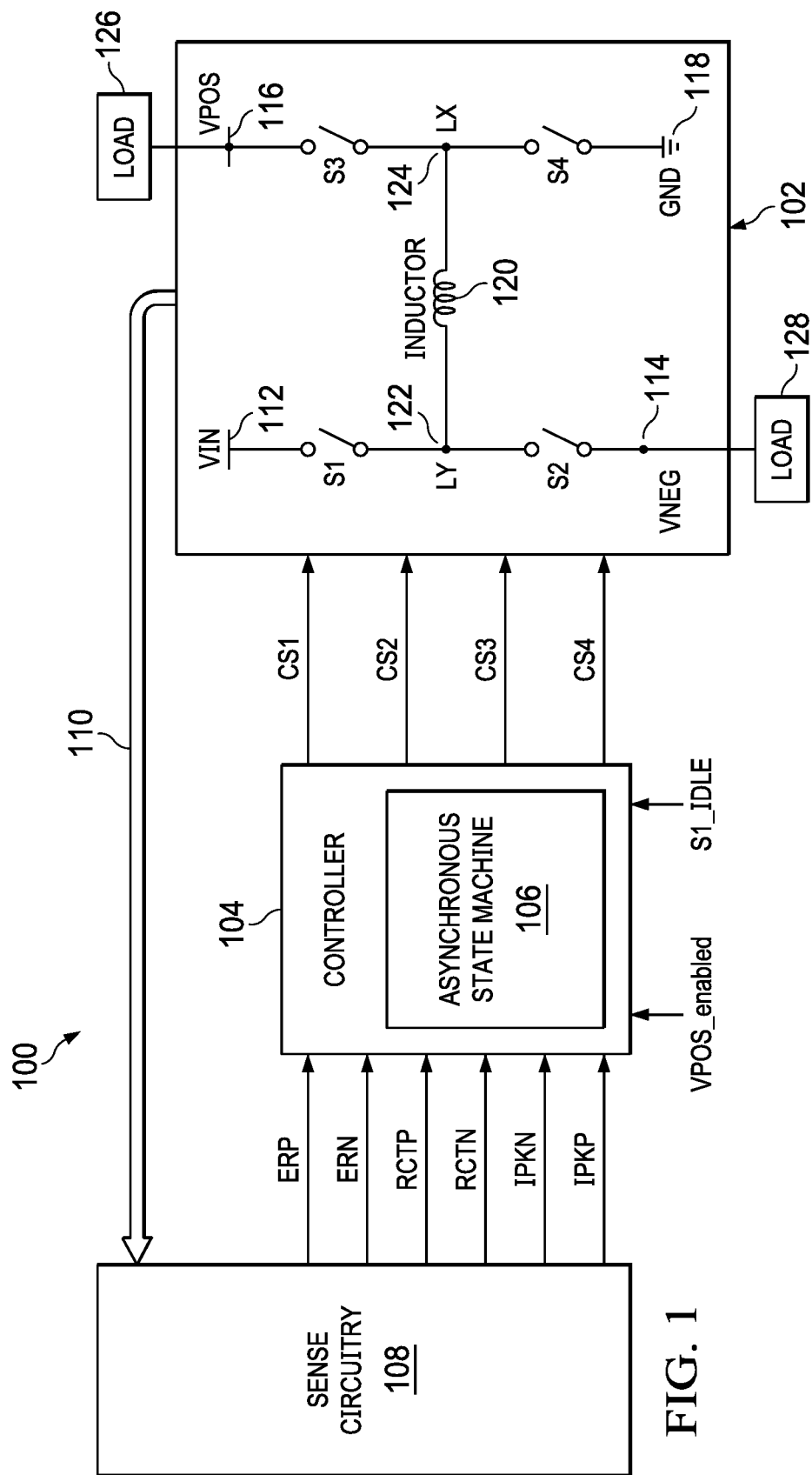
FIG. 1 is a block diagram showing a system in accordance with various examples.

FIG. 1 is a block diagram showing a system 100 in accordance with various examples. In FIG. 1, the system 100 represents a consumer product, an integrated circuit or chip, a printed circuit board (PCB) with integrated circuit and/or discrete components, and/or another electrical device. As shown, the system 100 comprises a SIMO converter circuit 102 coupled to a controller 104. The system 100 also comprises a sense circuit 108 coupled to the SIMO converter circuit 102 and to the controller 104. The system 100 also comprises a first load 126 coupled to a positive output supply node 116 of the SIMO converter circuit 102. The system 100 also comprises a second load 128 coupled to a negative output supply node 114 of the SIMO converter circuit 102. In other examples, the first load 126, the second load 128, and/or another load are coupled to both the positive output supply node 116 and the negative output supply node 114.

In the example of FIG. 1, the SIMO converter circuit 102 comprises a first switch (S1) coupled between a power supply (VIN) node 112 and a first inductor node (labeled "LY") 122. The SIMO converter circuit 102 also comprises a second switch (S2) coupled between the first inductor node 122 and the negative output supply node 114. The SIMO converter circuit 102 also comprises a third switch (S3) coupled between a second inductor node (labeled "LX") 124 and the positive output supply node 116. The SIMO converter circuit 102 also comprises a fourth switch (S4) coupled between the second inductor node 124 and a ground node 118. In some examples, a SIMO converter circuit, such as the SIMO converter circuit 102, may have multiple positive and negative rails (output supply nodes controlled by switches). In such examples, the switches for each of the positive rails may be controlled together or individually. Similarly, the switches for each of the negative rails may be controlled together or individually.

In FIG. 1, an inductor 120 is coupled between the first and second inductor nodes 122 and 124. In some examples, the inductor 120 is a discrete component that is added to the SIMO converter circuit 102 by coupling respective terminals of the inductor 120 to the first and second inductor nodes 122 and 124. In contrast, the other components of the SIMO converter circuit 102 may be part of an integrated circuit. In some examples, the inductor 120 is part of an integrated circuit. For example, an on-chip inductor may be placed side-by-side or on top of other integrated circuit components to form a multi-chip-module (MCM) configuration. This MCM configuration may be packaged and commercialized as a single integrated circuit or product. In another example, a discrete inductor is packaged together with an integrated circuit that includes some of the components of the system 100 to create a single packaged product. In different example examples, a single integrated circuit or multiple integrated circuits include the components represented for the SIMO converter circuit 120 in FIG. 1, the controller 102, and/or the sense circuitry 108. Also, in some examples, the first and second loads 126 and 128 are separate components or circuits relative to the SIMO converter circuit 102, the controller 104, and the sense circuit 108.

In the example of FIG. 1, the controller 104 supports various modes for the SIMO converter circuit 102 as well as switchable rest states. More specifically, the controller 104 is configured to provide an inductor charge mode, a positive boost mode, a negative boost mode, a first rest state involving S1, and a second rest state involving S4. For the inductor charge mode, the controller 104 is configured to close S1 and S4 and to open S2 and S3. For the positive boost mode, the controller 104 is configured to close S1 and S3 and to open S2 and S4. For the negative boost mode, the controller 104 is configured to close S2 and S4 and to open S1 and S3. For the first rest state, the controller 104 is configured to close S1 and to open S2, S3, and S4. For the second rest state, the controller 104 is configured to close S4 and to open S1, S2, and S3.

In some examples, the controller 104 comprises an asynchronous state machine 106 configured to adjust control signals (CS1-CS4) for S1-S4 of the SIMO converter circuit 102 to achieve the various modes or rest states described herein without a clock signal. More specifically, in the example of FIG. 1, the controller 104 receives various input signals from the sense circuitry 108, including a positive output supply voltage (ERP) signal corresponding to a voltage level at the positive output supply node 116, a negative output supply voltage level (ERN) signal corresponding to a voltage level at the positive output supply node 118, a positive inductor current lower threshold (RCTP), a negative inductor current lower threshold (RCTN), a positive inductor current lower threshold (RCTP), an inductor charged negative threshold (IPKN), and an inductor charged positive threshold (IPKP). In some examples, the controller 104 also receives enable signals such as a positive output supply enable signal (VPOS_enabled) and/or a first rest state enable signal (S1_IDLE).

In some examples, the asynchronous state machine 106 performs a state machine cycle that includes starting at one of the first or second rest states. The state machine cycle also includes performing at least one boost iteration that includes the inductor charge mode and the positive or negative boost mode. The state machine cycle also includes returning to one of the first or second rest states. In some examples, the controller 104 and/or asynchronous state machine includes arbitration logic (see e.g., the arbitration logic 240 in FIG. 2) configured to determine whether the positive boost mode or the negative boost mode is used in a given boost iteration. In some examples, the arbitration logic uses sense signals from the sense circuitry 108 to determine whether the positive boost mode or the negative boost mode is used in a given boost iteration.

As an example, the sense signals used by the arbitration logic to trigger a boost iteration include a positive output supply voltage level (e.g., ERP) and/or a negative output supply voltage level (e.g., ERP). For example, if ERP is farther from a respective target compared to ERN, the arbitration logic performs one or more boost iterations that include a positive boost mode. On the other hand, if ERN is farther from a respective target compared to ERP, the arbitration logic performs one or more boost iterations that include a negative boost mode. If both ERP and ERN are not at their respective targets, the arbitration logic may perform multiple boost iterations that include at least one positive boost mode and at least one negative beat mode.

In another example, ERP is a logic signal that signals the controller 104 to initiate a positive boost operation. The ERP signal is generated with a voltage comparator that compares VPOS (the voltage level at the VPOS node 116) to a predetermined threshold (VPOS_THRESHOLD). ERP is logic high if VPOS<VPOS_THRESHOLD. Similarly, the ERN signal may be generated with a voltage comparator that compares VNEG (the voltage level at the VNEG node 114) to a predetermined threshold (VNEG_THRESHOLD). ERN is logic high if VNEG>VNEG_THRESHOLD.

Once a boost iteration is triggered, the controller 104 performs the inductor charge mode by closing S1 and S4 while S2 and S3 are open. In some examples, the inductor charge mode continues until IPKN and/or IPKP indicate that the inductor charge is above a threshold. After the inductor charge mode is complete, the controller 104 transitions to the positive boost mode or the negative boost mode depending on arbitration results (e.g., which output supply voltage is farthest from a respective target and/or other criteria). After a positive or negative boost mode is complete (as indicated by RCTN or RCTP), the controller 104 transitions to another boost iteration or to one of the rest states depending on the input signals to the controller 104.

In some examples, the controller is configured to use the different rest states available depending on enable signals (VPOS_enabled and/or S1_IDLE) received from enable circuitry (not shown), where the enable signals are used to determine whether the state machine cycle returns to the first rest state or the second rest state. In some examples, the controller 104 is configured to start in the second rest state (S4 closed, and S1, S2, S3 open) by default. If VPOS_enabled is low (the positive output supply is disabled) when a decision to return to a rest state is due, the controller 104 returns to the second rest state after one or more boost iterations are complete. On the other hand, if VPOS_enabled is high (the positive output supply is enabled) when a decision to return to a rest state is due, the controller 104 returns to the first rest state (S1 closed, and S2, S3, S4 open) after one or more boost iterations. Additionally, if S1_IDLE is high, the controller 104 does not use the first rest state regardless of the status of VPOS_enabled. In some examples, S1_IDLE is used to determine if the controller 104 supports a dual rest state mode (e.g., switching between the first and second rest states as a function of VPOS_enabled) or a single rest state mode (e.g., using the second rest mode by default until S1_IDLE turns low).

Figure 2:
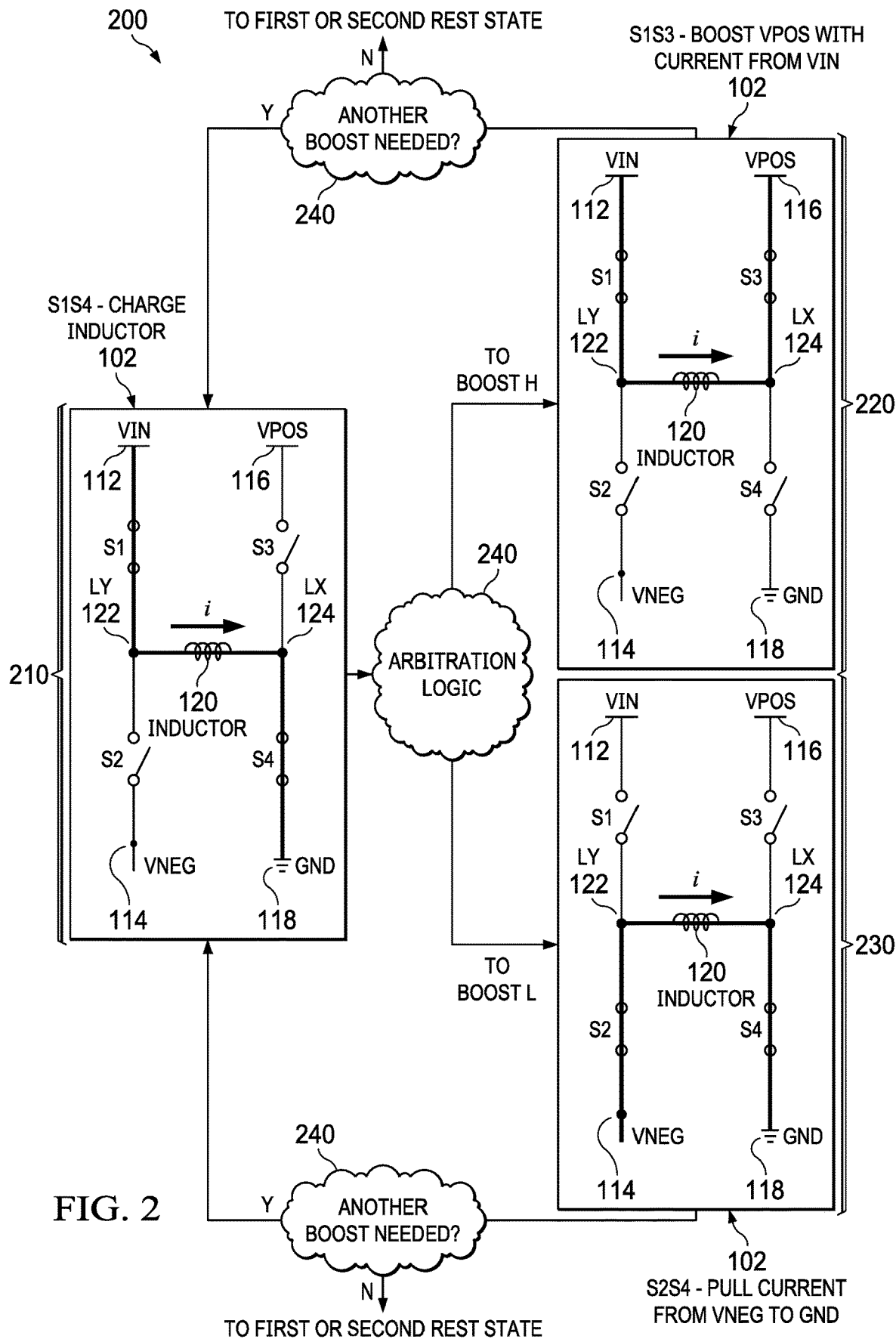
FIG. 2 is a set of schematic diagrams showing a boost iteration scenario in accordance with various examples.

FIG. 2 is a set of schematic diagrams showing a boost iteration scenario 200 in accordance with various examples. In scenario 200, a boost iteration is initiated by transitioning from a rest state (not shown) to an inductor charge mode arrangement 210 for the SIMO converter circuit 102. As shown in FIG. 2, the inductor charge mode arrangement 210 corresponds to S1 and S2 being closed while S2 and S3 are open. After the inductor charge mode is complete (e.g., signaled by IPKN and/or IPKP), arbitration logic 240 determines whether a positive boost or a negative boost will be performed. In some examples, the arbitration logic 240 uses ERP, ERN, and respective targets to determine whether perform a positive boost or a negative boost. For example, if ERP is farther from a respective target compared to ERN, the arbitration logic 240 performs one or more boost iterations that include a positive boost mode. On the other hand, if ERN is farther from a respective target compared to ERP, the arbitration logic 240 performs one or more boost iterations that include a negative boost mode. If both ERP and ERN are not at their respective targets, the arbitration logic 240 performs multiple boost iterations that include at least one positive boost mode and at least one negative boost mode. In another example, the ERP signal is generated with a voltage comparator that compares VPOS to a predetermined threshold (VPOS_THRESHOLD). If ERP is logic high (VPOS<VPOS_THRESHOLD), a positive boost is triggered. Similarly, the ERN signal is generated with a voltage comparator that compares VNEG to a predetermined threshold (VNEG_THRESHOLD). If ERN is logic high (VNEG>VNEG_THRESHOLD), a negative boost is triggered.

In scenario 200, a positive boost is performed by transitioning from the inductor charge mode arrangement 210 for the SIMO converter circuit 102 to the positive boost arrangement 220 for the SIMO converter circuit 102. As shown, the positive boost mode arrangement 220 corresponds to S1 and S3 being closed while S2 and S4 are open. After the positive boost mode is complete (e.g., signaled by RCTP), arbitration logic 240 determines whether another boost iteration is needed (e.g., based on ERP and/or ERN). If so, the scenario 200 returns to the inductor charge mode arrangement 210 for the SIMO converter circuit 102, and subsequently another positive or negative boost. Otherwise, if another boost iteration is not needed, the boost iteration scenario 200 is complete and the SIMO converter circuit 102 is placed in a first or second rest state as described herein. In some examples, the use of the different rest states depends on enable signals (e.g., VPOS_enabled and/or S1_IDLE) as described herein.

In scenario 200, a negative boost is performed by transitioning from the inductor charge mode arrangement 210 for the SIMO converter circuit 102 to the negative boost arrangement 230 for the SIMO converter circuit 102. As shown, the negative boost mode arrangement 230 corresponds to S2 and S4 being closed while S1 and S3 are open. After the negative boost mode is complete (e.g., signaled by RCTN), arbitration logic 240 determines whether another boost iteration is needed (e.g., based on ERP and/or ERN). If so, the scenario 200 returns to the inductor charge mode arrangement 210 for the SIMO converter circuit 102, and subsequently another positive or negative boost is performed. Otherwise, if another boost iteration is not needed, the boost iteration scenario 200 is complete and the SIMO converter circuit 102 is placed in a first or second rest state. In some examples, the use of the different rest states depends on enable signals (e.g., VPOS_enabled and/or S1_IDLE) as described herein.

In some examples, the second rest state (S4 is closed, while S1, S2, S3 are open) is used by default. If VPOS_enabled is low (the positive output supply is disabled) when a decision to return to a rest state is due, the second rest state is used after one or more boost iterations are complete. On the other hand, if VPOS_enabled is high (the positive output supply is enabled) when a decision to return to a rest state is due, the first rest state (S1 closed, while S2, S3, S4 are open) is used after one or more boost iterations. Additionally, if S1_IDLE is low, the first rest state is not used regardless of the status of VPOS_enabled. In some examples, S1_IDLE is used to determine if a dual rest state mode (e.g., switching between the first and second rest states as a function of VPOS_enabled) or a single rest state mode (e.g., using only the second rest mode until S1_IDLE turns high) is used.

Figure 3A:
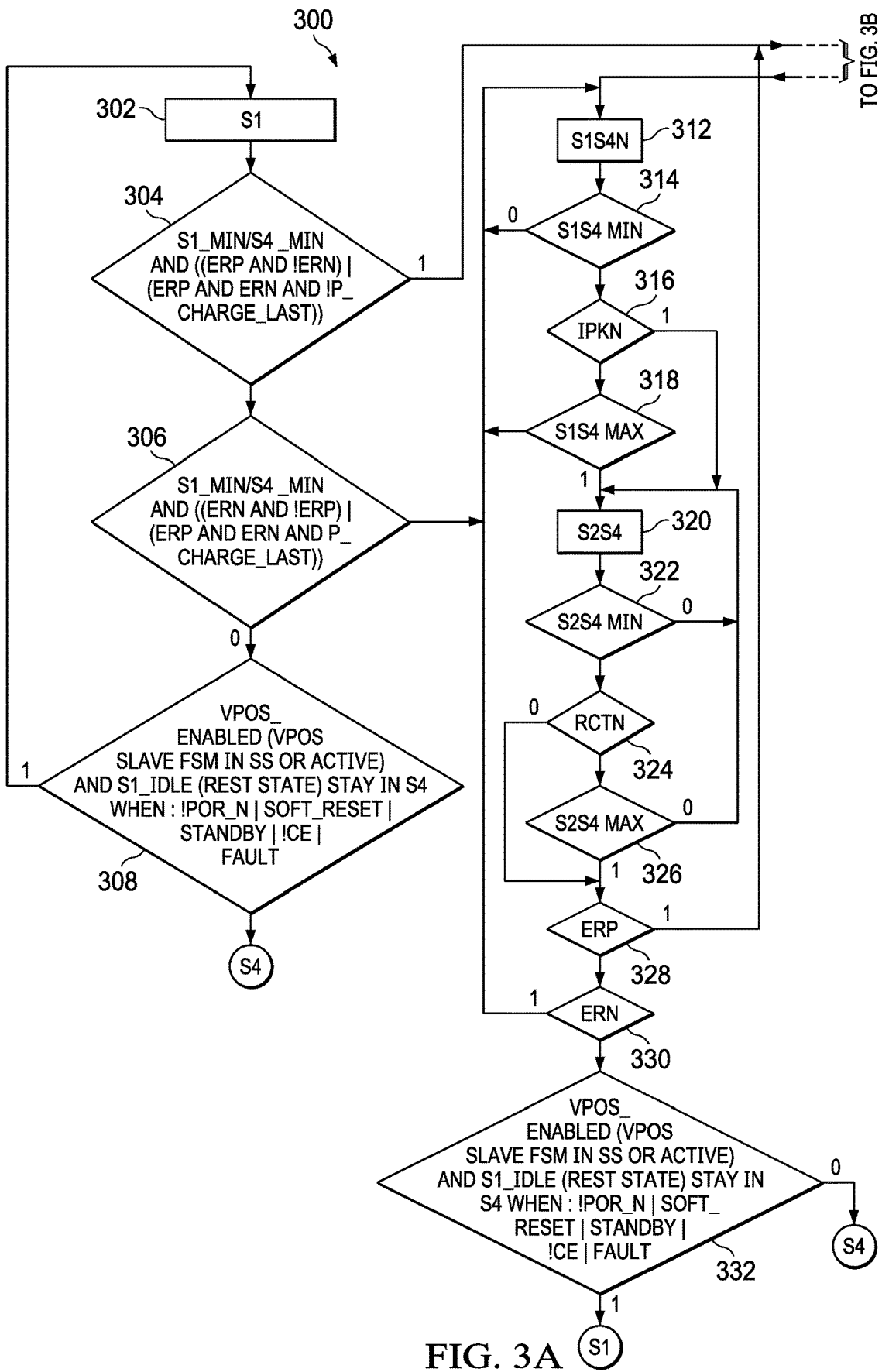
FIGS. 3A and 3B are a flowchart showing state machine method in accordance with various examples.
Figure 3B:
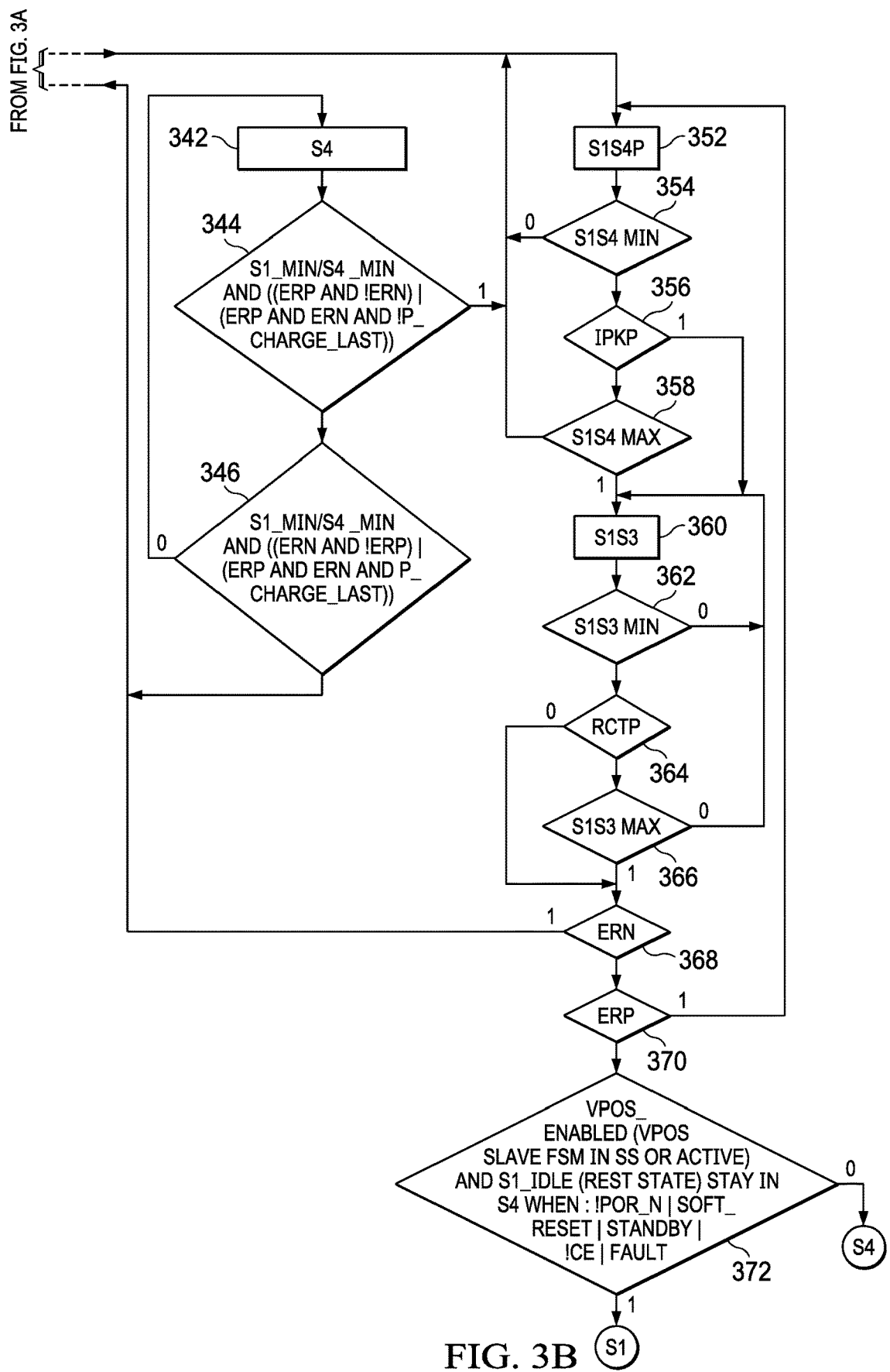

FIGS. 3A and 3B are a flowchart showing a state machine method 300 in accordance with various examples. In some examples, the state machine method 300 is performed by the controller 104 (e.g., by the asynchronous state machine 106) in FIG. 1. As shown, the state machine method 300 includes a second rest state 342 (labeled S4). In some examples, the second rest state 342 is the default rest state for the state machine method 300. At state 344, a determination is made regarding whether condition A is true. In some examples, condition A is given as:

$$A = S1\_MIN/S4\_MIN \ \& \ ((ERP\&!ERN)|ERP\& ERN\&!P\_CHARGE\_LAST)). \quad \text{Equation (1)}$$

In equation 1, condition A identifies when a positive boost iteration is needed based on a change in ERP relative to a previous value of ERP. If VPOS changes such that ERP is set high, or if ERP and ERN are logic high and the previous boost cycle boosted VNEG, the state machine method 300 proceeds from the second rest state 342 to a positive boost iteration by transitioning to the inductor charge mode state 352 for a positive boost iteration. If VPOS voltage changes ERP or keeps ERP at logic 0, the state machine method 300 transitions from state 344 to state 346. At state 346, a determination is made regarding whether condition B is true. In some examples, condition B is given as:

$$B = S1\_MIN/S4\_MIN \ \& \ ((ERN\&!ERP)|IERP\& \ ERN\& \ P\_CHARGE\_LAST)). \qquad \text{Equation (2)}$$

In equation 2, condition B identifies when a negative boost iteration is needed based on a change in ERN relative to a previous value of ERN. If VNEG changes such that ERN is set high, or if ERP and ERN are logic high and the previous boost cycle boosted VPOS, the state machine method 300 proceeds from the second rest state 342 to a negative boost iteration by transitioning to the inductor charge mode state 312 (for a negative boost iteration). At the inductor charge mode state 352, S1 and S4 are closed (while S2 and S3 are open) to charge an inductor. At state 354, an S1S4 MIN determination is made, where S1S4 MIN represents whether a minimum amount of time in the inductor charge mode (S1S4 closed) has been reached. As an example, the S1S4 MIN determination involves use of a timer and a S1S4 MIN threshold. If S1S4 MIN is false (the minimum amount of time has not been reached), the state machine method 300 returns to the inductor charge mode state 352. Otherwise, if S1S4 MIN is true (the minimum amount of time has been reached), the state machine method 300 transitions to a positive boost state 360 when IPKP reaches a threshold level (determined by state 356) and when S1S4 MAX is true (determined by state 358). S1S4 MAX indicates that a target or maximum amount of time in the inductor charge mode has been reached. At the positive boost state 360, S1 and S3 are closed (while S2 and S3 are open).

At state 362, an S1S3 MIN determination is made, where S1S3 MIN represents whether a minimum amount of time in the positive boost state charge mode (S1S3 closed) has been reached. If S1S3 MIN is false (the minimum amount of time has not been reached), the state machine method 300 returns to the positive boost state 360. Otherwise, if S1S3 MIN is true (the minimum amount of time has been reached), the state machine method 300 determines whether to perform another positive or negative boost iteration. More specifically, the state machine method 300 stays in the positive boost state 360 unless RCTP has reached a lower threshold (determined at state 364) and S1S3 MAX is true (determined at state 366). S1S3 MAX indicates that a target or maximum amount of time in the positive boost state has been reached. If states 364 and 366 indicate that the positive boost mode is complete, ERN is used (at state 368) to determine if a negative boost iteration is needed. If state 368 indicates that a negative boost iteration is needed (e.g., VNEG is smaller in magnitude than a target value), the state machine method 300 proceeds to the inductor charge mode state 312 (for a negative boost iteration). If state 368 indicates that a negative boost iteration is not needed (e.g., VNEG is smaller in magnitude than a target value), ERP is analyzed (at state 370) to determine if another positive boost iteration is needed. If state 370 indicates that a positive boost iteration is needed (VPOS is smaller than a target value), the state machine method 300 proceeds to the inductor charge mode state 352 (for a positive boost iteration). If state 370 indicates that a positive boost iteration is not needed (VPOS is smaller than a target value), the state machine method 300 selects one of two rest states by determining if condition C is true at state 372. In some examples, condition C is given as:

$$C = VPOS\_\text{enabled} \ (VPOS \text{ Slave } FSM \text{ in } SS \text{ or} \\ ACTIVE) \ \& \ S1\_IDLE \text{ (Rest)}. \qquad \text{Equation (3)}$$

In equation 3, condition C indicates if V_POS enabled is high and S1_IDLE is high. If condition C is true, the state machine method 300 transitions to the first rest state 302. Otherwise, if condition C is not true, the state machine method 300 transitions to the second rest state 342. In some examples, the state machine method 300 stays in the second rest state 342 when a condition given as !POR_N|SOFT_RESET|STANDBY|49 CE|FAULT exists. This condition indicates when a device has not finished powering up (POR_N), when a soft reset command is sent from a host (SOFT_RESET), when the device is in standby, when the pin chip enable is low, and when the part is in fault state. In summary, this condition is present when a SIMO converter circuit is disabled.

When in the first rest state 302, the state machine method 300 stays in the first rest state 302 until condition A or B is true as represented by states 304 and 306. If condition A is true, the state machine method 300 proceeds to the inductor charge mode state 352 (for a positive boost iteration). If condition A is not true and condition B is true, the state machine method 300 proceeds to the inductor charge mode state 312 (for a negative boost iteration).

At the inductor charge mode state 312, S1 and S4 are closed (while S2 and S3 are open). At state 314, an S1S4 MIN determination is made. If S1S4 MIN is false, the state machine method 300 returns to the inductor charge mode state 312. Otherwise, if S1S4 MIN is true, the state machine method 300 transitions to a negative boost state 320 when IPKN reaches a threshold level (determined by state 366) and when S1S4 MAX is true (determined by state 318). At the negative boost state 320, S2 and S4 are closed (while S1 and S3 are open).

At state 322, an S2S4 MIN determination is made. If S2S4 MIN is false, the state machine method 300 returns to the negative boost state 320. Otherwise, if S2S4 MIN is true, the state machine method 300 determines whether to perform another positive or negative boost iteration. Most specifically, the state machine method 300 stays in the negative boost state 320 unless RCTN has reached a lower threshold (determined at state 324) and S2S4 MAX is true (determined at state 326). If states 324 and 326 indicate that the negative boost mode is complete, ERP is analyzed (at state 328) to determine if a positive boost iteration is needed. If state 328 indicates that a positive boost iteration is needed (e.g., VPOS is smaller than a target value), the state machine method 300 proceeds to the inductor charge mode state 342 (for a positive boost iteration). If state 328 indicates that a positive boost iteration is not needed (e.g., VPOS is equal to or greater than a target value), ERN is analyzed (at state 330) to determine if another negative boost iteration is needed. If state 330 indicates that a negative boost iteration is needed (VNEG is smaller in magnitude than a target value), the state machine method 300 proceeds to the inductor charge mode state 312 (for a negative boost iteration). If state 330 indicates that a negative boost iteration is not needed (e.g., VNEG is equal to or greater in magnitude than a target value), the state machine method 300 selects one of two rest states by determining if condition C is true at state 332. If condition C is true, the state machine method 300 transitions to the first rest state 302. Otherwise, if condition C is not true, the state machine method 300 transitions to the second rest state 342.

Figure 4:
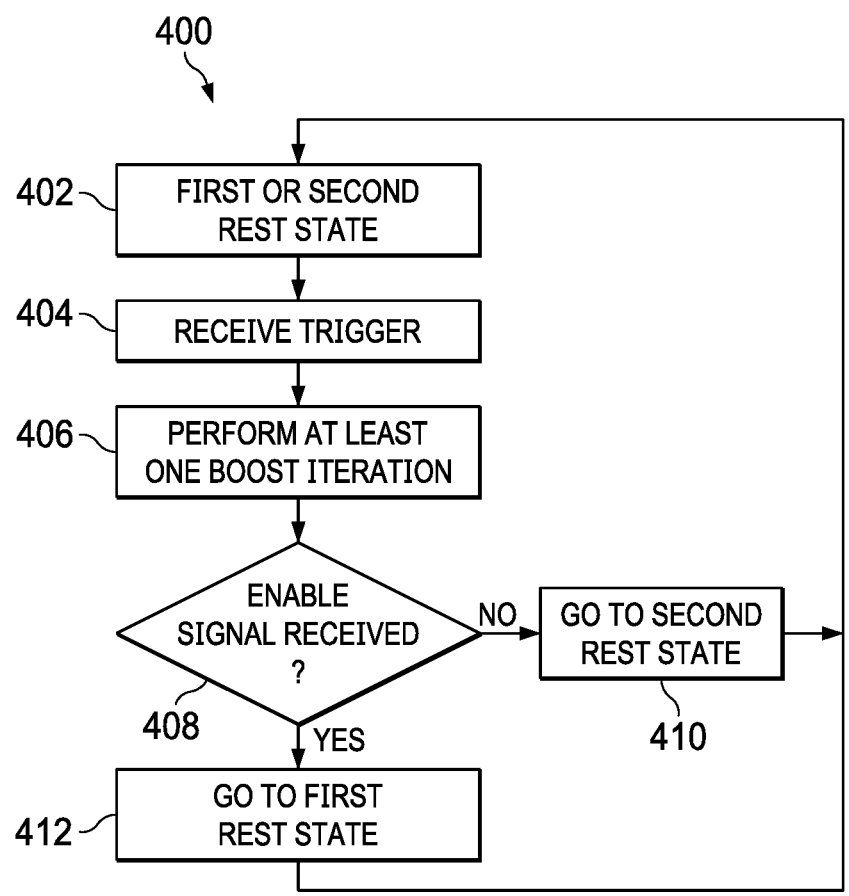
FIG. 4 is a flowchart showing a single-input multiple-output (SIMO) converter control method in accordance with various examples.

FIG. 4 is a flowchart showing a SIMO converter control method 400 in accordance with various examples. In some examples, the method 400 is performed by a controller (e.g., the controller 104 in FIG. 1) or a state machine (e.g., the asynchronous state machine 106 in FIG. 1). As shown, the method 400 comprises a first or second rest state 402. At block 404, a trigger is received (e.g., condition A or B in the state machine method 300, VNEG relative to a target or threshold, VPOS relative to a target or threshold, etc.). At block 406, at least one boost iteration is performed. In some examples, each boost iteration includes an inductor charge mode and a positive or negative boost mode as described herein. If an enable signal (e.g., VPOS_enabled) is not received (determination block 408), the method 400 transitions to the second rest state at block 410. Otherwise, if an enable signal is received (determination block 408), the method transitions to the first rest state at block 412. In some examples, another enable signal (e.g., S1_IDLE) determines whether a SIMO converter operates in a dual rest state mode or a single rest state mode. From blocks 410 and 412, the method returns to block 402.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ." The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising: an inductor having first and second terminals; a first switch coupled between the first terminal a first end of the inductor and a voltage supply terminal node; a second switch coupled between the first terminal end of the inductor and a negative output supply terminal node; a third switch coupled between the second terminal a second end of the inductor and a positive output supply terminal node; a fourth switch coupled between the second terminal end of the inductor and a ground terminal node; and a controller coupled to the first, second, third, and fourth switches, the controller configured to provide: an inductor charge mode; a positive boost mode; a negative boost mode; a first rest state in which the controller closes the first switch and opens the second, third and fourth switches; and a second rest state in which the controller closes the fourth switch and opens the first, second and third switches.

2. The system of claim 1, wherein: for the inductor charge mode, the controller is configured to close the first and fourth switches and to open the second and third switches; for the positive boost mode, the controller is configured to close the first and third switches and to open the second and fourth switches; and for the negative boost mode, the controller is configured to close the second and fourth switches and to open the first and third switches.

3. The system of claim 1, wherein the controller comprises an asynchronous state machine configured to perform a state machine cycle that includes: starting at one of the first or second rest states; performing at least one boost iteration that includes the inductor charge mode and the positive or negative boost mode; and returning to one of the first or second rest states.

4. The system of claim 3, wherein the controller comprises arbitration logic configured to determine whether the positive boost mode or the negative boost mode is used in a given boost iteration.

5. The system of claim 4, further comprising sense circuitry coupled to the controller, wherein the arbitration logic is configured to determine whether the positive boost mode or the negative boost mode is used in a given boost iteration, responsive to sense signals from the sense circuitry.

6. The system of claim 5, wherein the sense signals include a positive output supply voltage level and a negative output supply voltage level.

7. The system of claim 3, further comprising sense circuitry coupled to the controller, wherein sense signals from the sense circuitry are used to determine when the state machine cycle returns to one of the first or second rest states.

8. The system of claim 3, further comprising enable circuitry coupled to the controller, wherein enable signals from the enable circuitry are used to determine whether the state machine cycle returns to the first rest state or the second rest state.

9. The system of claim 3, wherein the state machine cycle is configured to start in the second rest state by default and to transition to the first rest state after a given boost iteration responsive to a positive output enable signal.

10. The system of claim 3, wherein the asynchronous state machine is configured to switch between single rest state operations and dual rest state operations based on a dual rest state enable signal.

11. A single-input multiple-output (SIMO) converter circuit, comprising: a first switch coupled between a first inductor terminal node and a voltage supply terminal; a second switch coupled between the first inductor terminal node and a negative output supply terminal; a third switch coupled between a second inductor terminal node and a positive output supply terminal; a fourth switch coupled between the second inductor terminal node and a ground terminal; and a controller coupled to the first, second, third and fourth switches, the controller configured to switch between: a first rest state in which the controller closes the first switch and opens the second, third and fourth switches; and a second rest state in which the controller closes the fourth switch and opens the first, second and third switches.

12. The SIMO converter circuit of claim 11, wherein: the controller is configured to provide an inductor charge mode by closing the first and fourth switches and opening the second and third switches; the controller is configured to provide a positive boost mode by closing the first and third switches and opening the second and fourth switches; and the controller is configured to provide a negative boost mode by closing the second and fourth switches and opening the first and third switches.

13. The SIMO converter circuit of claim 12, wherein the controller comprises an asynchronous state machine configured to perform a state machine cycle that includes: starting at one of the first or second rest states; performing at least one boost iteration that includes the inductor charge mode and the positive or negative boost mode; and returning to one of the first or second rest states.

14. The SIMO converter circuit of claim 13, further comprising sense circuitry coupled to the controller, wherein the controller comprises arbitration logic configured to determine whether the positive boost mode or the negative boost mode is used in a given boost iteration, responsive to sense signals from the sense circuitry.

15. The SIMO converter circuit of claim 13, further comprising enable circuitry coupled to the controller, wherein enable signals from the enable circuitry are used to determine whether the state machine cycle returns to the first rest state or the second rest state.

16. A device, comprising: a first switch coupled between a first inductor terminal and a voltage supply terminal; a second switch coupled between the first inductor terminal and a negative output supply terminal; a third switch coupled between a second inductor terminal and a positive output supply terminal; a fourth switch coupled between the second inductor terminal node and a ground terminal; and an asynchronous state machine coupled to the first, second, third, and fourth switches, the asynchronous state machine configured to switch between: a first rest state in which the controller closes the first switch and opens the second, third and fourth switches; and a second rest state in which the controller closes the fourth switch and opens the first, second and third switches.

17. The device of claim 16, wherein the asynchronous state machine is configured to perform a state machine cycle that includes: starting at one of the first or second rest states; performing at least one boost iteration that includes an inductor charge mode and a positive or negative boost mode; and returning to one of the first or second rest states.

18. The device of claim 17, further comprising sense circuitry coupled to the asynchronous state machine, wherein the asynchronous state machine comprises arbitration logic configured to determine whether the positive boost mode or the negative boost mode is used in a given boost iteration, responsive to sense signals from the sense circuitry.

19. The device of claim 17, further comprising enable circuitry coupled to the controller, wherein at least one enable signal from the enable circuitry is used to determine whether the state machine cycle returns to the first rest state or the second rest state.

20. The device of claim 19, wherein the state machine cycle is configured to start in the second rest state by default and to transition to the first rest state after a given boost iteration responsive to a positive output enable signal.

21. The device of claim 19, wherein the asynchronous state machine is configured to switch between single rest state operations and dual rest state operations based on a dual rest state enable signal.

* * * * *